US008914275B2

(12) United States Patent
Morin et al.

(10) Patent No.: US 8,914,275 B2
(45) Date of Patent: Dec. 16, 2014

(54) TEXT PREDICTION

(75) Inventors: Frederic Morin, Bellevue, WA (US); David A. Stevens, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 13/080,792

(22) Filed: Apr. 6, 2011

(65) Prior Publication Data

US 2012/0259615 A1 Oct. 11, 2012

(51) Int. Cl.
G06F 17/20 (2006.01)
G06F 3/023 (2006.01)
G06F 17/27 (2006.01)

(52) U.S. Cl.
CPC ............ *G06F 17/276* (2013.01); *G06F 3/0237* (2013.01)
USPC .................................................. 704/1; 704/9

(58) Field of Classification Search
USPC .................................................. 704/1, 9, 10
See application file for complete search history.

(56) References Cited

U.S. PATENT DOCUMENTS

| | | | |
|---|---|---|---|
| 6,573,844 B1 | 6/2003 | Venolia et al. | |
| 6,654,733 B1 | 11/2003 | Goodman et al. | |
| 7,412,441 B2 * | 8/2008 | Scott et al. | ............................. 1/1 |
| 7,469,205 B2 * | 12/2008 | Aronowitz et al. | ............. 704/10 |
| 7,480,612 B2 | 1/2009 | Mori et al. | |
| 7,809,719 B2 | 10/2010 | Furuuchi et al. | |
| 7,877,258 B1 * | 1/2011 | Chelba et al. | ................. 704/257 |
| 2002/0077808 A1 * | 6/2002 | Liu et al. | .......................... 704/10 |
| 2004/0155869 A1 * | 8/2004 | Robinson et al. | ............. 345/168 |
| 2006/0004564 A1 * | 1/2006 | Aronowitz et al. | ............. 704/10 |
| 2006/0206313 A1 * | 9/2006 | Xu et al. | .......................... 704/10 |
| 2006/0253274 A1 * | 11/2006 | Miller | ................................ 704/9 |
| 2006/0265208 A1 * | 11/2006 | Assadollahi | ....................... 704/9 |
| 2007/0239434 A1 * | 10/2007 | Rubanovich et al. | ............. 704/9 |
| 2009/0192786 A1 * | 7/2009 | Assadollahi | ....................... 704/9 |
| 2009/0195506 A1 | 8/2009 | Geidl et al. | |
| 2009/0199092 A1 * | 8/2009 | Ghassabian | ................... 715/261 |
| 2011/0202876 A1 | 8/2011 | Badger et al. | |
| 2012/0029910 A1 * | 2/2012 | Medlock et al. | ................... 704/9 |

OTHER PUBLICATIONS

Eng, et al., "Radiology Report Entry with Automatic Phrase Completion Driven by Language Modeling", Retrieved at <<http://radiographics.rsna.org/content/24/5/1493.full.pdf+html>>, vol. 24, No. 5, Sep.-Oct. 2004, pp. 1493-1501.

(Continued)

*Primary Examiner* — Douglas Godbold
(74) *Attorney, Agent, or Firm* — Timothy Churna; Kate Drakos; Micky Minhas

(57) ABSTRACT

One or more techniques and/or systems are provided for suggesting a word and/or phrase to a user based at least upon a prefix of one or more characters that the user has inputted. Words in a database are respectively assigned a unique identifier. Generally, the unique identifiers are assigned sequentially and contiguously, beginning with a first word alphabetically and ending with a last word alphabetically. When a user inputted prefix is received, a range of unique identifiers corresponding to words respectively having a prefix that matches the user inputted prefix are identified. Typically, the range of unique identifiers corresponds to substantially all of the words that begin with the given prefix and does not correspond to words that do not begin with the given prefix. The unique identifiers may then be compared to a probability database to identify which words have a higher probability of being selected by the user.

20 Claims, 6 Drawing Sheets

(56) References Cited

OTHER PUBLICATIONS

Coetzee, Derrick, "TinyLex: Static N-Gram Index Pruning with Perfect Recall", http://www.cs.berkeley.edu/~dcoetzee/publications/TinyLex,%20Static%20N-Gram%20Index%20Pruning%20with%20Perfect%20Recall.pdf, In the Proceeding of the 17th ACM conference on information and knowledge management, Oct. 26-30, 2008.

Carmignani, Nicola, "Predicting Words and Sentences using Statistical Models", http://nicolacarmignani.altervista.org/files/talks/Prediction.pdf, Jul. 5, 2006.

Bickel, et al., "Predicting Sentences using N-Gram Language Models", http://www.aclweb.org/anthology-new/H/H05/H05-1025.pdf, In the Proceedings of Human Language Technology Conference and Conference on Empirical Methods in Natural Language Processing, Oct. 2005, pp. 193-200.

Muise, et al., "Exploiting N-Gram Analysis to Predict Operator Sequences", http://www.google.com/url?sa=t&source=web&cd=1&ved=0CBUQFjAA&url=http%3A%2F%2Fwww.aaai.org%2Focs%2Findex.php%2FICAPS%2FICAPS09%2Fpaper%2Fdownload%2F741%2F1141&ei=MWJCTa6gGcW28QP4v9XvDw&usg=AFQjCNGBoJ4Zsgvdy_erm-AeF4GrLbasLw&sig2=—gVXG8OusE7erPRbdcgXaw, 2009, pp. 374-377.

\* cited by examiner

TEXT PREDICTION

BACKGROUND

Auto-complete or text prediction techniques are used to predict a word or phrase that a user is inputting based upon one or more characters that the user has already inputted. Today, such techniques are used by a wide array of applications to increase the speed and efficiency, or accuracy, with which users input data. For example, such auto-complete techniques are commonly used in conjunction with SMS applications (e.g., text messaging applications) and/or email applications on mobile devices because the user input aspect of mobiles devices (e.g., the qwerty keyboards, the touchscreens, etc.) are generally small and hamper a user's ability to quickly input text. Moreover, in other applications, such as in search applications, auto-complete techniques are used to assist the user in quickly generating a string of one or more search terms and/or promoting the correct spelling of words. In this way, the search results may better reflect the intent of the user, for example. Still, in other applications, other benefits may be derived from the use of auto-complete or text prediction techniques.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for looking up and/or identifying words based upon a given text string of one or more characters are provided. For example, in one embodiment, a text string, also referred to herein as a character set, of one or more characters that are inputted by a user are received. Based upon this input, one or more words in a lexicon (e.g., a database of words) having a prefix that matches the first character set are identified.

Respective words in the lexicon are respectively associated with a unique identifier (e.g., a number). Generally, the words are arranged alphabetically and respective words are assigned a unique identifier sequentially and contiguously. Thus, for example, the word "parent" may be assigned the number 1,000,000 and the word "parents" may be assigned the number 1,000,001 because the word "parents" follows the word "parent" alphabetically, for example. It will be appreciated that because the respective words are uniquely identified sequentially, given a text string (e.g., a word prefix), a range of unique identifiers that are associated with words having the given word prefix may be identified. For example, if the prefix "par" were inputted by a user, unique identifiers 1,000,000 through 1,000,050 may be identified if the words associated with the unique identifiers of 1,000,000 to 1,000,050 begin with the prefix "par."

Once a range of one or more unique identifiers of words having a prefix that corresponds to (e.g., matches) the inputted text string has been identified, the range can be compared to a probability database to determine which word(s) within the range is more likely to be the word the user is intending to input (relative to the other words associated with unique identifiers within the range), and the more likely word(s) can be presented to the user for incorporation into the field that the user is inputting characters into, for example. In this way, text predictions can be made given a word sequence without having to index letter-based representations of the word (e.g., which can be time consuming and/or computationally intensive), for example.

In another embodiment, as will be described below, the text prediction can be further improved by predicting a word and/or phrase based upon a chain of one or more previously inputted/selected words and one or more inputted characters that comprise the word the user is presently inputting. For example, given the phrase "the ca," a prediction may be made that the word beginning with the letter "ca" is a noun (e.g., because nouns typically follow the phrase "the"), and thus words that begin with "ca" but are not nouns may be excluded from the prediction (e.g., and may not appear as potential words to the user).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
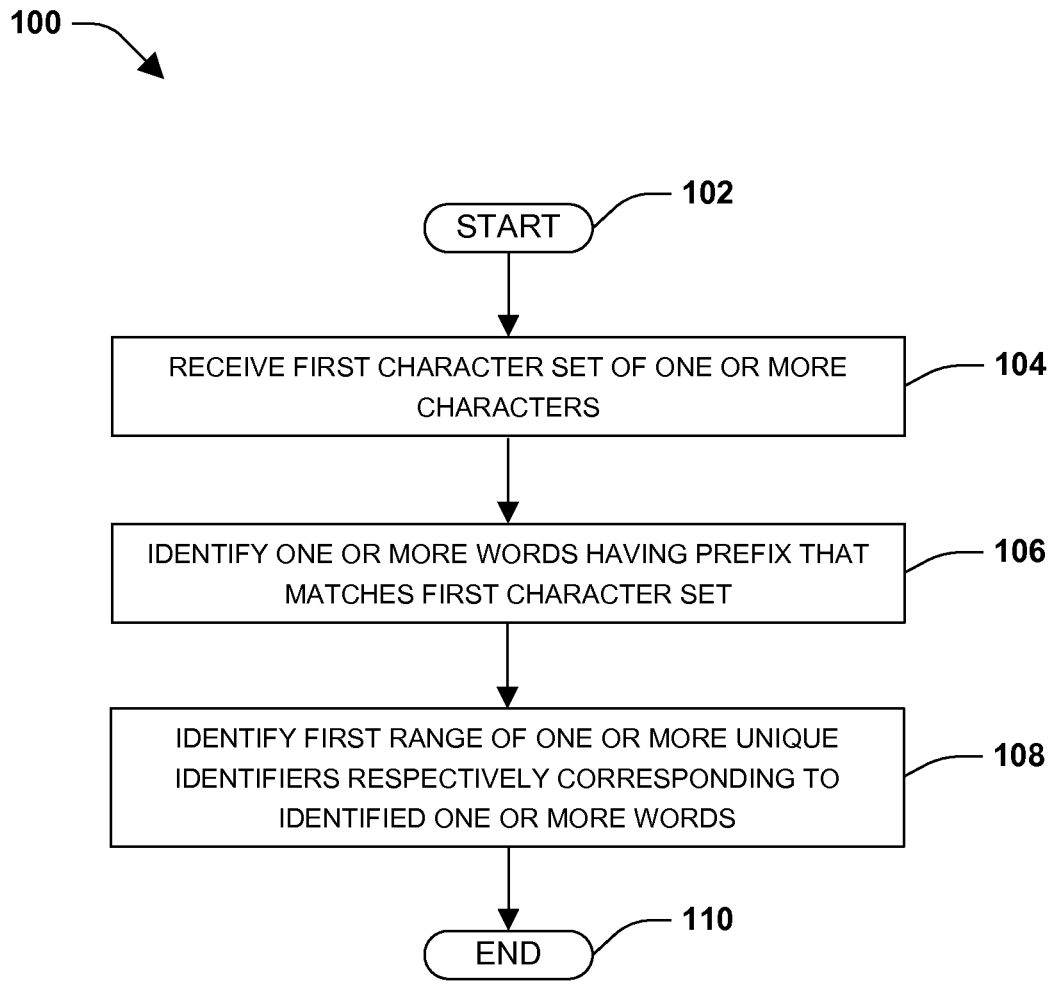
FIG. 1 is an exemplary method for identifying a range of one or more unique identifiers respectively corresponding to words having prefixes that match a first character set comprising one or more characters.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Autocomplete features, such as those commonly found in text messaging applications, search engine applications, etc. predict a word and/or phrase a user is inputting based upon a set of one or more characters that the user has previously inputted. The more characters that the user inputs, the narrower the field of possible words/phrases, and generally, the better the prediction can be.

Presently, predictions are made by computing the respective probability of respective words/phrases that have a prefix that matches the character/characters inputted/selected by the user. For example, suppose a user were to merely entered the character "c," respective words that begin with the letter "c" would be identified in a prefix tree (e.g., with a root node being with the letter "c") and a probability for respective words within the root node "c" would be computed. The 5 or so words that are more probable would then be identified and presented to the user as the possible words, for example.

It will be appreciated that the conventional prediction techniques are slow and computationally intensive. For example, there may be tens of thousands of words that begin with the letter "c." Thus, tens of thousands of operations or computations may have to be performed to identify respective words and their respective probabilities. Such operations, even if individually performed rapidly, may consume a substantial amount of time and/or resources when viewed in the aggregate.

As described herein, systems and/or techniques for predicting words based upon user input are provided herein. Respective words in a lexicon (e.g., a dictionary of words) are assigned a unique identifier. For example, respective words may be assigned a number. The unique identifiers are generally assigned such that words sharing a prefix (e.g., "par") have contiguous identifiers. N-grams may be encoded using these word identifiers, for example. In this way, given a prefix, a resulting n-gram can be quickly indexed without indexing letter based representations. That is, stated differently, based upon a user inputted character set of one or more characters, which define a prefix, a range of unique identifiers corresponding to words comprising the defined prefix may be identified. A database comprising respective unique identifiers and the probabilities of respective words corresponding to respective unique identifiers may be reviewed to determine which word(s) has a higher probability of being input by a user. One or more words having a higher probability (e.g., relative to the words associated with the remaining unique identifiers within the identified range) may be then presented to the user for incorporation into a field that is receiving user input, for example.

FIG. 1 illustrates one example method 100. The example method 100 begins at 102, and a first set of one or more characters is received at 104. For example, in one embodiment, a user inputs (e.g., by selecting, typing, etc.) one or more characters into a search query field and/or into a field for generating an email message or a text message. It will be appreciated that such characters provide a basis, or reference point, from which to identify words and/or make predictions about the word/phrase the user is inputting.

The example method 100 also comprises identifying one or more words having a prefix that matches the first character set at 106. That is, a lexicon (e.g., a database) comprising one or more words is searched to identify a set of one or more words that correspond to (e.g., have a prefix that matches) the first character set that was received at 104. For example, if a user were to input the characters "pa," words beginning with the prefix "pa" would be identified. It will be appreciated that as described further below, fewer than all of the words beginning with the prefix "pa" may be identified. For example, in one embodiment, merely the first word alphabetically that begins with "pa" and the last word alphabetically that begins with "pa" may be identified. Thus, the identification of one or more words having a prefix that matches the first character set may comprise identifying fewer than all of the words having a prefix that matches the first character set (e.g., because as will be discussed later, the unique identifiers for words that fall alphabetically between the first word alphabetically having a given prefix and the last word alphabetically having the given prefix can be identified merely based upon the unique identifiers for the first word alphabetically and the last word alphabetically).

Respective words in the lexicon are associated with a unique identifier, such as a unique number. For example, respective entries in a database may comprise one word and one unique identifier. Generally, unique identifiers are assigned to the words sequentially and contiguously, such that the lower the word is in the alphabet, the lower the unique identifier and the higher the word is in the alphabet, the higher the unique identifier or vice versa, for example. Typically, no two words in the lexicon are associated with a same unique identifier. Thus, in one example, if the word "parent" is assigned the unique identifier 750,000, the word "parents" may be assigned the unique identifier 750,001 if the word "parents" immediately follows the word "parent" alphabetically in the lexicon. It will be appreciated that while the unique identifiers described herein are numbers, other forms of unique identifiers are also contemplated.

At 108 in the example method 100, a first range of one or more unique identifiers respectively corresponding to the identified words is identified. Stated differently, the unique identifiers respectively associated with a word having a prefix that matches the received character set are identified. It will be appreciated that because the unique identifiers are assigned to the words sequentially, words comprising a given prefix may be within a contiguous range of identifiers. For example, words that have the prefix "pa" may be within the range of unique identifiers beginning at 750,000 and ending at 768,000. Every word within this range begins with "pa" and no words outside this range (e.g., that are comprised in the lexicon) begin with "pa." That is, by identifying the first word in the alphabet that begins with the characters "pa" and its respective unique identifier and by identifying the last word in the alphabet that begins with the characters "pa" and its respective unique identifier, a range of one or more unique identifiers corresponding to the first character set of one or more characters can be identified (e.g., where the range begins with the unique identifier corresponding to the first word in the alphabet that begins with the characters "pa" and ends with the unique identifier corresponding to the last word in the alphabet that begins with the characters "pa"). Thus, as described above, by merely identifying the first word and the last word having a given prefix (e.g., a prefix that matches the first character set) at 106, a range of unique identifiers corresponding to the words in the lexicon beginning with the given prefix can be identified. Conversely, substantially all of the words having a prefix that matches the first character set can be identified at 106, and a range of unique identifiers can be identified at 108 based upon the identification of substantially all the words at 106.

In one embodiment, based upon the identified first range, probabilities of words respectively associated with a unique identifier within the range can be computed and/or determined, and words that are more likely to be a word the user is intending to input based upon the received first character set can be identified. For example, the first range of one or more unique identifiers can be compared with a database respectively comprising predetermined probabilities for respective words (e.g., and thus for respective unique identifiers). Within the given first range, unique identifiers (e.g., and thus words corresponding to those unique identifiers) associated with a higher probability can be determined or identified. In this way, words that are more likely to match the word the user is intending to input can be determined or predicted, for example.

Words associated with, or corresponding to, a unique identifier within the identified range that have a probability that exceeds a predetermined probability threshold (e.g., the five words that have the highest probability, words that have a probability that exceeds 0.85, etc.) may be displayed or presented to the user for selection and/or incorporation into the field in which the user is inputting characters, for example. In this way, a user is presented with one or more words that have a prefix matching the characters the user has already input and with words that have a higher probability of being selected by the user (e.g., relative to other words in the lexicon that have the same prefix), for example.

It will be appreciated that number of possible words, and thus the range of the unique identifiers may be reduced if additional characters are received (e.g., which increases the size of the first character set). For example, if one or more characters are received that increases the size of the first character set, the number of possible words, and the range of unique identifiers may be reduced or narrowed. That is, returning to the example above, when the characters "pa" were received, a range of unique identifiers of 750,000 to 768,000 was identified. If another character was subsequently inputted by the user, for example, if the user were to enter "pat," the range of possible words, and thus the range of unique identifier may be narrowed, or reduced to a range of between 760,000 and 760,100, for example. Moreover, probabilities for words merely corresponding to unique identifiers within the range of 760,000 and 760,100 would be determined (e.g., significantly reducing the number of possible words). It will be appreciated that the second range of between 760,000 and 760,100 is comprised within the first range of 750,000 to 768,000 because the letters "pa" were not altered. Thus, so long as characters are merely added to a character set, and the previously entered character set is not altered, the subsequent ranges (e.g., resulting from the added characters) will be comprised within the first range. However, if one or more of the initially entered and/or initially received characters is altered (e.g., the user backspaces and changes the "pa" to a "pi"), a new range of unique identifiers that may not overlap and/or may not be comprised within the first range of unique identifiers may be identified At 110, the example method 100 ends.

Figure 2:
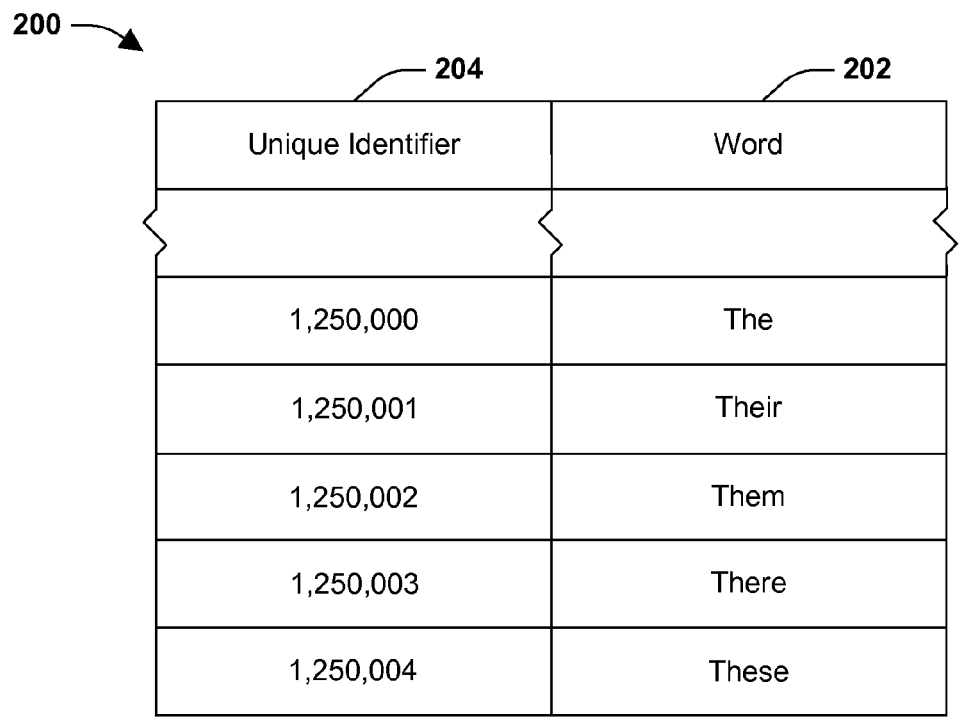
FIG. 2 is an exemplary lexicon comprising a table, where respective words in the lexicon are associated with a unique identifier.

FIG. 2 illustrates an example lexicon 200 that may be comprised in a database, for example, and configured to store words 202 and unique identifiers 204 respectively corresponding to a word. It will be appreciated that the example lexicon 200 merely illustrates a small portion of a lexicon, and the actual lexicon 200 may be much larger than the illustrated portion. For example, in one embodiment, nearly every word in the English language and/or in another language may be stored in the lexicon 200.

As illustrated, respective words 202 are associated with a unique identifier 204. Generally, no two words in the lexicon 200 are associated with the same unique identifier, and, in one embodiment, the words 202 are ordered alphabetically, and are assigned a unique identifier sequentially and contiguously. That is, for example, the words are stored in a prefix tree and are respectively assigned increasing integers (e.g., if the unique identifiers are integers). For example, as illustrated, the word "the" is assigned the unique identifier 1,250,000 and the word "their" is assigned the unique identifier 1,250,001 because the word "their" immediately follows the word "the" alphabetically in the lexicon. Similarly, the word "them" would be assigned the unique identifier 1,250,002 if the word "them" immediately follows the word "their" alphabetically in the lexicon 200, for example. It will be appreciated that while the unique identifiers 204 illustrated herein follow a standard numbering scheme, other types of unique identifiers are contemplated herein. For example, in other embodiment, the unique identifiers 204 are Roman numerals. In yet another embodiment, the unique identifiers 204 are characters other than numeral characters, for example.

If a user were to input the characters "the" (e.g., and thus a character set comprising the characters "the" was received), words 202 in the lexicon 200 having a prefix that begin with the letters "the" may be identified and so too may corresponding unique identifiers. For example, as illustrated herein, the words 202 "the," "their," "them," "there," and "these" (e.g., among others) and their respective unique identifiers 204 1,250,000 through 1,250,004 may be identified. Presuming this is all of the words that have the prefix "the," a first range of unique identifiers (e.g., 1,250,000-1,250,004) may thus be identified/determined based upon the received character set. That is, stated differently, given a word prefix, a sub-tree of the prefix tree is defined, where the sub-tree is associated with a set of words and their unique identifiers respectively.

It will be appreciated that while reference is made to identifying respective words in the lexicon 200 that begin with the given prefix "the," in another embodiment, merely that first word in the alphabet that has the prefix "the" and the last word in the alphabet that has the prefix "the," and their corresponding unique identifiers, may be identified to determine a range of unique identifiers corresponding to words that have a prefix that matches the inputted character set. For example, by merely identifying the first word, "the," and the last word, "these," a range of unique identifiers (e.g., 1,250,000-1,250,004) corresponding to words having the given prefix can be identified (e.g., so long as the unique identifiers are ordered sequentially and are contiguous).

Figure 3:
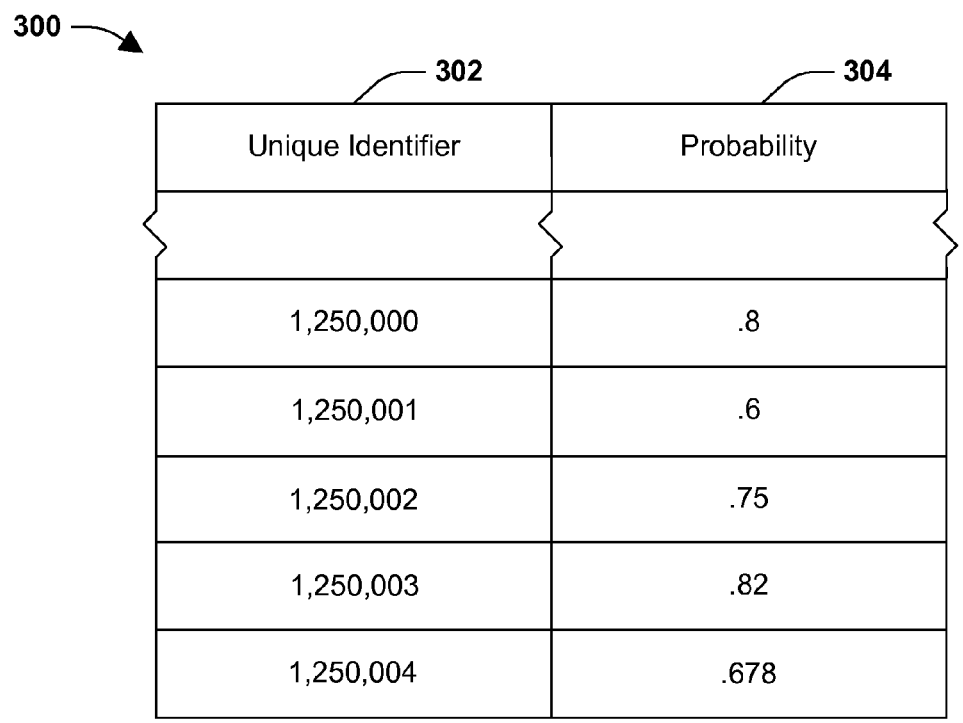
FIG. 3 is an exemplary probability lookup table, where respective unique identifiers are associated with a probability, where the probability is indicative of the likelihood that a respective word associated with a respective unique identifier is a word the user is intending to input.

FIG. 3 illustrates an example lookup table 300 that may be stored in a database, for example, and may be used to determine the probability 304 of respective words given a range of unique identifiers 302 corresponding to words comprising a prefix that matches a received character set. Thus, returning to the example given with respect to FIG. 2, assume the character set "the" has been received and a range of unique identifiers 1,250,000-1,250,004 has been identified. The range may then be compared to a lookup table 300 (e.g., comprising respective unique identifiers 302 corresponding to the words 202 in the lexicon 200 in FIG. 2 and respective probabilities 304). Words corresponding to unique identifiers 302 with a higher probability (e.g., within the specified range of unique identifiers) may be determined. For example, with the range of 1,250,000-1,250,004, the unique identifier 1,250,003 has the highest probability (e.g., 0.82) and the unique identifier 1,250,000 has the second highest probability (e.g., 0.80).

In one embodiment, one or more words corresponding to the unique identifiers with a higher probability within a specified range of unique identifiers (e.g., within a range corresponding to the received character set) may be identified and presented to a user as possible words that user is attempting to input. It will be appreciated that the number of words that are identified and/or presented to the user may vary depending upon, among other things, the screen size upon which the words will be displayed, a predetermined probability threshold, etc. For example, in the illustrated example, if the two words having the highest probability within the given range were displayed, the words "there" and "the" would be presented to the user because their corresponding unique identifiers 302, 1,250,003 and 1,250,000, respectively, have the two highest probabilities (e.g., 0.82 and 0.8, respectively) within the specified range of 1,250,000 to 1,250,004 in the lookup table 300, for example.

Figure 4:
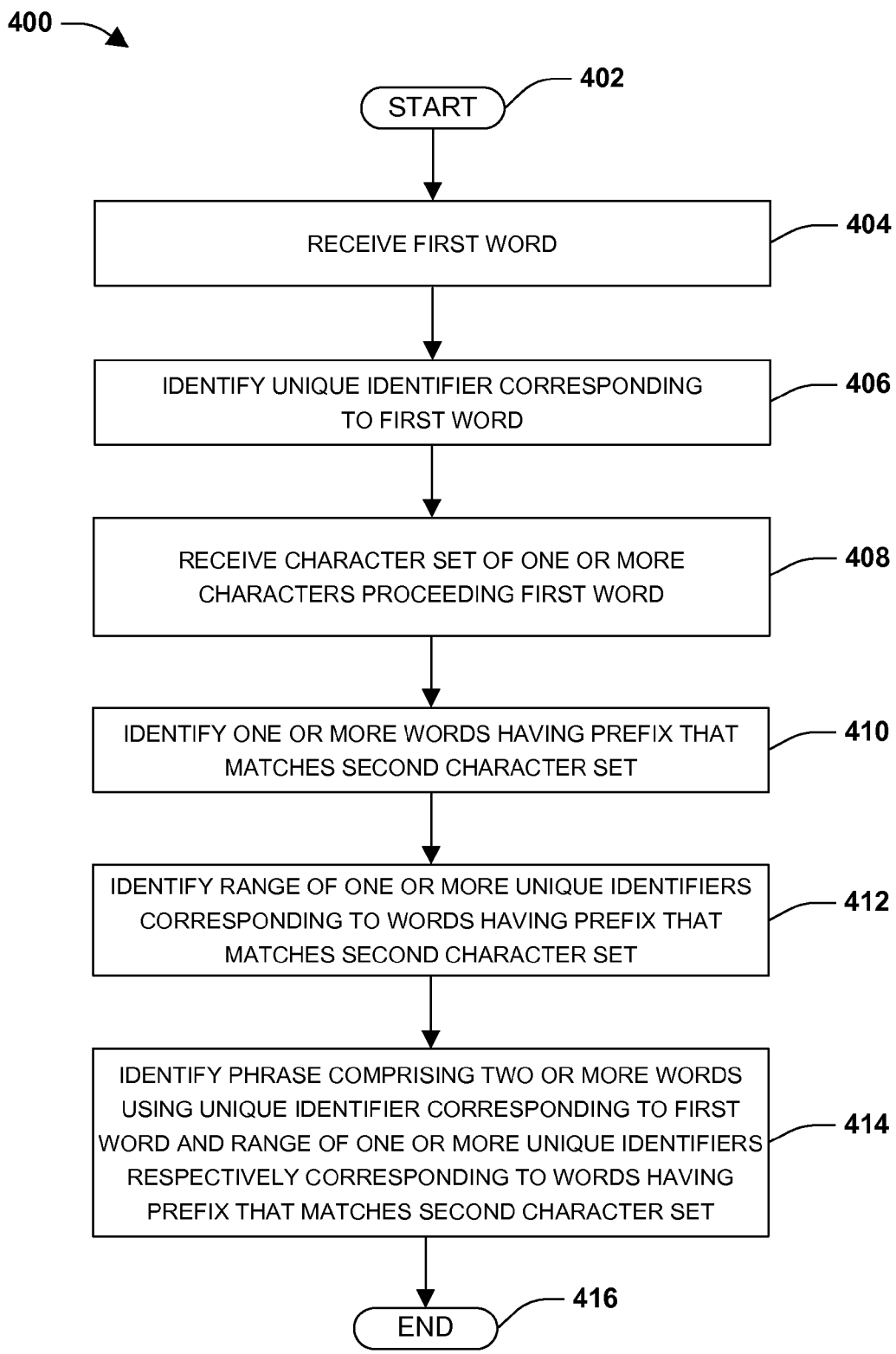
FIG. 4 is an exemplary method for identifying a phrase based upon two or more unique identifiers.

It will be appreciated that additional information, besides the prefix of a word, can be taken into consideration when determining the probability of a word (e.g., when determining which words to display to a user). For example, FIG. 4 illustrates an example method 400 for predicting a word based upon a prefix of the word and an immediately preceding word. The example method 400 begins at 402, and a first word (e.g., followed by a character indicating a space) is received at 404. Stated differently, a first set one or more characters is received at 404, where the last character of the first set of characters may be space (e.g., to delineate the set of characters as a word as opposed to merely a prefix).

At 406 in the example method a unique identifier corresponding to the received first word is identified. For example, returning to FIG. 2, if the first word was "the," the unique identifier 1,250,000 may be identified. It will be appreciated that in one embodiment, the word (e.g. "the") is merely treated as a prefix and thus a plurality of words (e.g., and/or unique identifiers corresponding to respective words) that have the prefix "the" may be identified (e.g., the unique identifiers 1,250,000-1,250,004 may be identified). In such an embodiment, because the first set of characters comprises a space, the lowest unique identifier, for example, may be identified as corresponding to the first word because the lowest unique identifier corresponds to the first word in the alphabet having the received prefix. Thus, even if the range of unique identifiers 1,250,000-1,250,004 were initially identified, in one embodiment, the first word is identified as being associated with the unique identifier 1,250,000 at 406 because that unique identifier is associated with the first word in the alphabet having the prefix "the."

At 408 in the example method 400, a character set of one or more characters proceeding the first word (e.g., following the character designating the space) is received. For example, if the user were to input the characters "the ca," the characters "the" would be broken off as a first set of one or more characters (e.g., as a first word) and the "ca" would be considered a second character set of one or more characters proceeding the word "the." Thus, a string characters may be broken into two or more character sets if the string comprises a character indicative of a space, for example.

At 410 in the example method 400, one or more words having a prefix that matches the second character set is identified. That is, in the example where the character set comprises the characters "ca," one or more words having the prefix "ca" may be identified in a lexicon (e.g. 200 in FIG. 2) in a manner similar to that described with respect to FIG. 2, for example. It will be appreciated that, as described above, fewer than all of the words in the lexicon having the prefix "ca" may be identified. For example, in one embodiment, merely the first word alphabetically that begins with the characters "ca" and the last word alphabetically that beings with the characters "ca" may be identified. Thus, while reference is made to identifying words having a prefix that matches the second character set, it will be appreciated that such identification is not intended to be limited to identifying all the words that have a prefix that matches that second character set. In some embodiments, fewer than all of the words having the given prefix may be identified (e.g., merely first and last words alphabetically).

At 412 in the example method 400, a range of one or more unique identifiers corresponding to words having a prefix that matches the second character set are identified as described with respect to FIG. 2. Thus, in the given example, unique identifiers for words having a prefix that corresponds to "ca" are identified. As described above, such a range may be identified based upon the unique identifier corresponding to the first word in the alphabet that begins with "ca" and the last words in the alphabet that begins with "ca." That is, for example, unique identifiers ranging from 300,000 to 315,000 may be identified (e.g., where the unique identifiers in the range of 300,000 to 315,000 respectively correspond to a word that begins with "ca"). It will be appreciated that generally no words outside of the identified range of unique identifiers begin with "ca" and no words within the range begin with characters other than "ca."

At 414 in the example method 400, one or more phrases comprising two or more words are identified using the unique identifier corresponding to the first word and the range of one or more unique identifiers respectively corresponding to words having a prefix that matches the second character set. Stated differently, probabilities for the second word are determined based upon the unique identifier for the first word (e.g. "the") and the range of unique identifiers respectively corresponding to a word that has the prefix "ca," to identify a phrase (e.g., such as "the cat," "the car," etc.). For example, in one embodiment, bi-grams are generated using techniques known to those skilled in the art to determine which word(s) is more likely to follow the word "the" that begins with the prefix "ca." It will be appreciated that the use of a word preceding a prefix to assist in determining which word(s) are more probable given the prefix "ca," may improve the accuracy of the prediction (e.g., improving the chances that a word that is presented to the user is a word the user selects) relative to merely determining probabilities based upon the prefix alone, for example.

Moreover, it will be appreciated that while reference is made to merely identifying a phrase based upon a single word and a subsequent prefix, in another embodiment, a phrase may be identified based upon two or more preceding words and a subsequent prefix. In such an embodiment, a unique identifier for respective preceding words may be identified along with the range of unique identifiers corresponding to words having a prefix that matches the subsequent prefix, and these may be used in conjunction with one another to identify phrases that more likely correspond with (e.g., match) a phrase the user is inputting, for example.

The example method 400 ends at 416.

Figure 5:
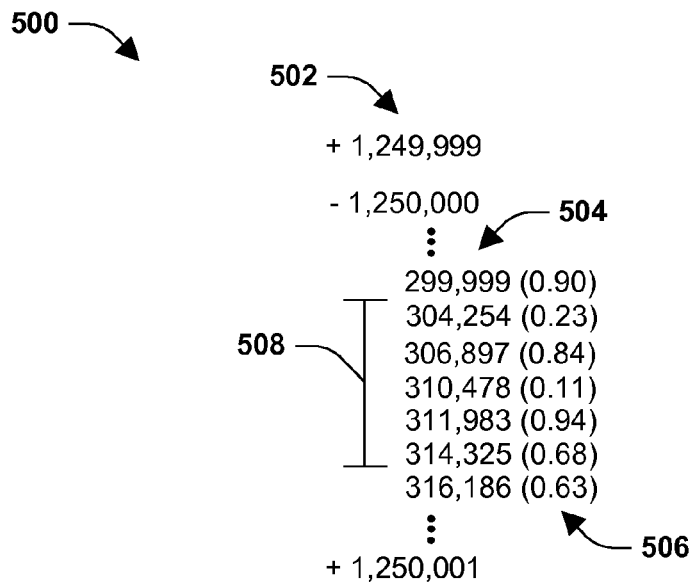
FIG. 5 is an exemplary probability chart, where a first column comprises unique identifiers for a first word, a second column comprises unique identifiers for a second word that proceeds the first word, and a third column comprises a probability that a phrase comprised of the first and the second word is a phrase the user is intending to input.

FIG. 5 illustrates an example database 500 for determining probabilities of words given a preceding word and a prefix of the words such as may be used to identify probabilities for words/phrases, such as at 414 in the example method 400 of FIG. 4, for example. Specifically, FIG. 5 illustrates a drop down menu, for example, where a first column 502 comprises unique identifiers for the first word (e.g., the preceding word) of the phrase, a second column 504 comprises unique identifiers for a second word of the phrase, and a third column 506 provides respective probabilities of the phrases.

Returning to the example described with respect to FIG. 4, suppose the user has input the characters "the ca." As described above, the word "the" may be associated with the unique identifier 1,250,000. Thus, as illustrated, the unique identifier for "the" in the first column (e.g., 1,250,000) is expanded to reveal unique identifiers corresponding to words that proceed the word "the." It will be appreciated that merely a consolidated list of the unique identifiers of words that commonly proceed the term "the" is illustrated in FIG. 5, and the actual list of unique identifiers may be greater than illustrated herein (e.g., the number of unique identifiers between 1,250,000 and 1,250,001 may be substantially greater than what is actually illustrated).

Further, as described above, the prefix "ca" may be associated with words corresponding to unique identifiers in the range 508 of 300,000 to 315,000. Thus words (e.g., and unique identifiers) outside the identified range may be excluded from being considered. For example, in the second column, the unique identifiers 299,999 and 316,186 may be excluded from the group of possible words and/or phrases because those unique identifiers do not fall within the identified range of 300,000 to 315,000.

It will be appreciated that some words that begin with the prefix "ca" may not typically follow "the," and thus would have a probability of substantially zero. For example, while many nouns can follow the word "the," few, if any, verbs follow such a word. Thus, verbs that begin with the prefix "ca" and have unique identifiers within the range of 300,000 to 315,000 would have a probability of substantially zero when following the word "the." It will be appreciated that to reduce the amount of data, for example, unique identifiers that correspond with words that typically do not follow the word "the"(e.g., having a probability of substantially zero) may be excluded from the second column 504 (e.g., because the second column merely illustrates unique identifiers corresponding to words that may follow the word "the" in a phrase).

Within the range 508, the probabilities listed in the third column 506 of respective phrases are compared to identify which phrase(s) have a higher probability of being the phrase that the user is intending to input (e.g., or which word has a higher probability of following the word "the"). For example, in the illustrated example, the phrase comprising words corresponding to unique identifiers 1,250,000 (e.g., "the") and 311,983 (e.g., "car," for example) would be a more probable phrase. Thus, the phrase "the car," and possibly one or more other phrases (e.g., "the cat") having a higher probability (e.g., relative to the probability of other phrases within the range 508) may be presented to the user for selection/incorporation into the text the user is inputting, for example.

Figure 6:
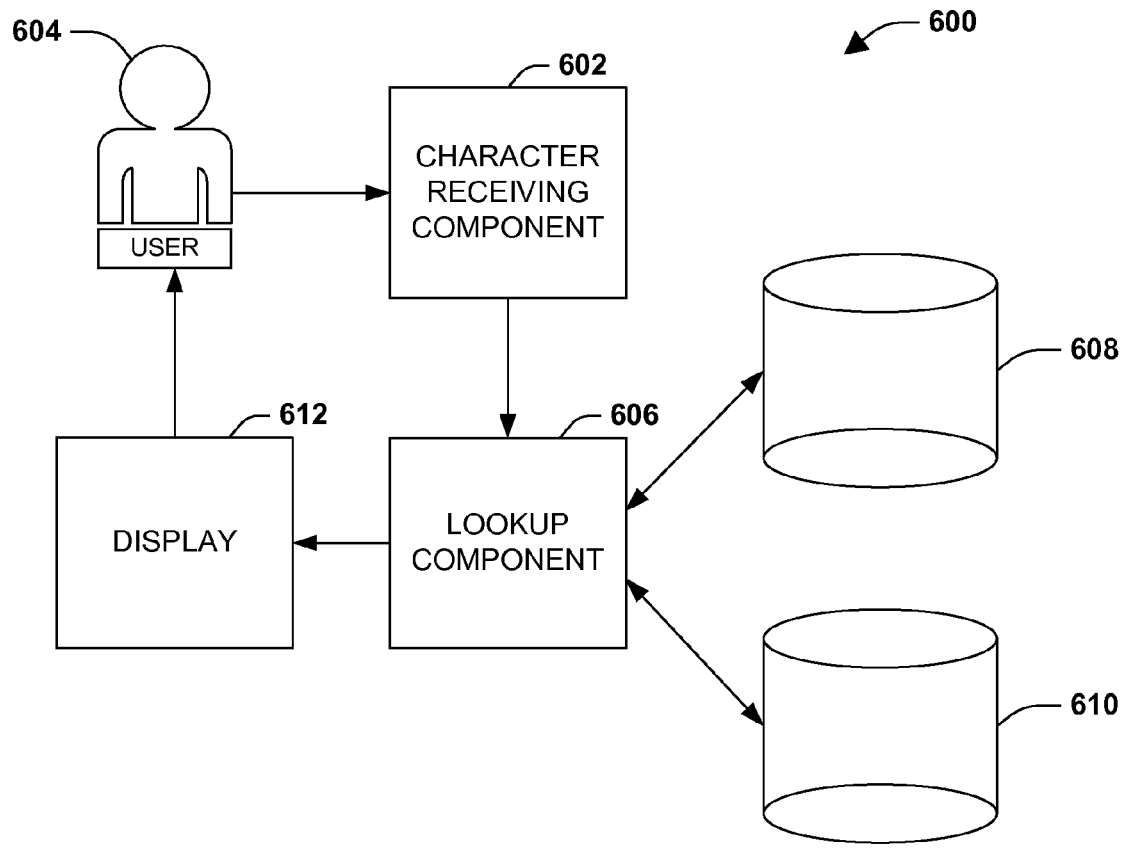
FIG. 6 is an exemplary system for identifying a range of one or more unique identifiers respectively corresponding to words having prefixes that match a first character set comprising one or more characters.

FIG. 6 illustrates an example system 600 for text prediction. Such a system may be configured to predict a word and/or a phrase based upon user input and/or known probabilities of words/phrases (e.g. which words/phrases are used more often).

The example system 600 comprises a character receiving component 602 configured to receive input and/or a selection of characters from a user 604. For example, the user 604 may enter text using a touchscreen device, keyboard, or other input device, and the entered text or other user input may be received by the character receiving component 602. It will be appreciated that such text may herein be referred to as a received character set of one or more characters because the text generally comprises at least one character.

The character receiving component 602 is operable coupled to a lookup component 606 and is configured to transmit the received character set of one or more characters to the lookup component 606. The lookup component 606 is configured to receive the character set and to identify a range of one or more unique identifiers respectively corresponding to one or more words that comprise a prefix that matches, or otherwise corresponds to, the received character set of one or more characters.

As described above, the words are generally ordered alphabetically and unique identifiers are generally assigned to the words sequentially and/or contiguously. Thus, for example, the word "parent" may be assigned a first unique identifier (e.g., a first integer) and the word "parents" may be assigned a second unique identifier (e.g., a second integer) that immediately proceeds the first unique identifier in a sequence. That is, for example, if the word "parent" is assigned the unique identifier 1,250,000, the word "parents" may be assigned the unique identifier 1,250,001 because the integer 1,250,001 immediately proceeds the integer 1,250,000. It will be appreciated that generally no two words in a lexicon are associated with the same unique identifier. That is, a unique identifier is unique to merely one word in the lexicon.

In one embodiment, the lookup component 606 is operably coupled to a database 608 comprising a lexicon of one or more words. Respective words are associated with a respective unique identifier (e.g., as illustrated in FIG. 2). The lookup component 606 is configured to search the database 608, or more specifically the lexicon, to identify one or more words and corresponding unique identifiers comprising a prefix that matches the received character set of one or more characters (e.g., which may referred to as a given prefix). For example, in one embodiment, the lookup component 606 searches for substantially all of the words in the lexicon that comprise the given prefix, and based upon the identification of words, can identify unique identifiers for respective words having prefixes that match the given prefix. In another embodiment, the lookup component 606 merely searches for a first word alphabetically in the lexicon that begins with the given prefix and a last word alphabetically in the lexicon that begins with the given prefix. If the unique identifiers are assigned to the words sequentially and/or contiguously, it will be appreciated that words that fall between the first word and the last word that begin with the given prefix will have a unique identifier that falls (e.g., numerically) between a unique identifier corresponding to the first word and a unique identifier corresponding to the last word. Thus, a range of unique identifiers corresponding to words with the given prefix can be determined by the lookup component 606 by identifying substantially all of the words that have the given prefix (e.g., and recording their respective unique identifiers) and/or by merely identifying the first and last word alphabetically that have the given prefix (e.g., and identifying a range of unique identifiers beginning with a unique identifier corresponding to the first word alphabetically that has the given prefix and ending with a unique identifier corresponding to the last word alphabetically that has the given prefix).

It will be appreciated that the character receiving component 602 may continue to receive additional input from the user 604 after the initial first set of one or more characters are transmitted to the lookup component 606, and, in one embodiment, the character receiving component is configured to transmit the additional input (e.g., or replacement input) to the lookup component 606. In this way, the lookup component 606, for example, can redo and/or update the search to identify a range that corresponds to words in light of the replacement and/or additional characters (e.g., in real-time). For example, if the initial character set merely comprised the characters "pa," the lookup component 606 may identify a range of unique identifiers corresponding to words that begin with the prefix "pa" (e.g. a range of 1,000,000 to 1,130,000, for example). If an additional character is subsequently received (e.g., the user inputted text is modified to "pat"), the range of unique identifiers may be updated (e.g., to a range of 1,080,000 to 1,089,000), for example. It will be appreciated that as long as characters are merely added to the initial character set (e.g., and the initial character set is not changed), the updated range will generally fall within the initial range, but may be a narrow or small portion of the initial range. However, if one of the characters comprised in the initial character set is modified and/or deleted, the updated range may be outside of the initial range, for example.

Once a range of unique identifiers has been identified, the lookup component is configured to search a probability database 610 comprising a probability table, for example, (e.g., as illustrated in FIG. 3). The probability table provides for, among other things, probability information with respect to word usage. Stated differently, the probability database provides information on how likely or unlikely it is that a user is inputting a given word (e.g., based upon historical data of word usage). In one embodiment, the probability table comprises a column listing respective unique identifiers and a second column listing the probability for respective words associated with respective unique identifiers (e.g., and/or possibly other data, such as bi-grams, as illustrated in FIG. 5). The lookup component 606, is thus configured to search the probability database 610 to determine which unique identifiers (e.g., and thus which words and/or phrases) within the identified range of unique identifiers have a higher probability (e.g., relative to the probability of other unique identifiers within the identified range of unique identifiers).

In the example system 600, the lookup component 606 is further configured to present the words that have the higher probability to the user 604 via a display 612, for example. In this way, a group of words that have a higher probability of being the word the user 604 is intending to input may be displayed to the user for selection and/or incorporation into a field in which the user 604 is inputting data.

It will be appreciated that the example system 600 is merely intended to illustrate one example system and is not intended to limit the scope of the instant application, including the claims. For example, the database 608 comprising the lexicon and the database 610 comprising the probabilities may be a single database or one or more interrelated databases. Moreover, the components may provide additional features from those herein described. For example, in one embodiment, the lookup component 606 is further configured to identify one or more phrases (e.g., using the techniques described with respect to FIG. 4) based upon at least two unique identifiers, a first unique identifier associated with a prefix of a first word (e.g., "the") and a second unique identifier, or range of identifiers, associated with a prefix of a second word (e.g., "ca"), for example. In such an embodiment, one or more of the databases 608, 610 may comprise probability information similar to that described with respect to FIG. 5.

Moreover, it will be appreciated that the components of the example system 600 herein described may be part of a single device (e.g., such as a mobile device and/or a personal computer), or may spread out across a plurality of devices. For example, in one embodiment, the display 612 may be part of a personal computer (e.g., a client device), and the character receiving component 602, lookup component 606, and/or databases 608, 610 may be components of a server, where the personal computer is operably coupled to the server via a network, for example. In such an embodiment, the characters may be input by the user 604 on a client device and may be transmitted to the character receiving component 602 via the network. Moreover, after the lookup component 606 has identified the words that have a higher probability of being the word the user 604 is intending to input, the words may be transmitted to the client device (e.g., and the display 612) via the lookup component 606, for example.

Figure 7:
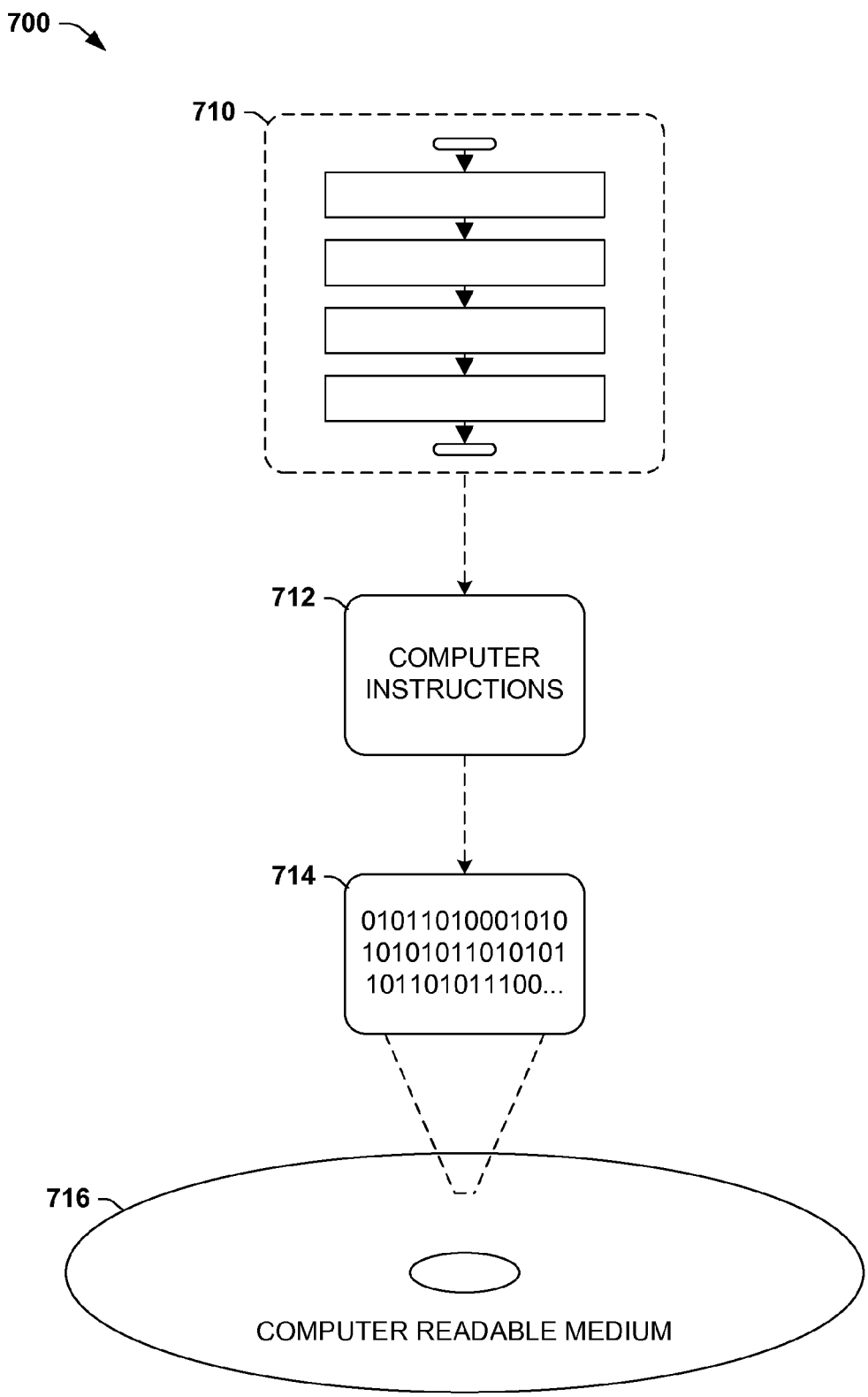
FIG. 7 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 716 (e.g., a CD-R, DVD-R, or a platter of a hard disk drive), on which is encoded computer-readable data 714. This computer-readable data 714 in turn comprises a set of computer instructions 712 configured to operate according to one or more of the principles set forth herein. In one such embodiment 700, the processor-executable computer instructions 712 may be configured to perform a method 710, such as the exemplary method 100 of FIG. 1, for example. In another such embodiment, the processor-executable instructions 712 may be configured to implement a system, such as at least some of the exemplary system 600 of FIG. 6, for example. Many such computer-readable media 716 may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
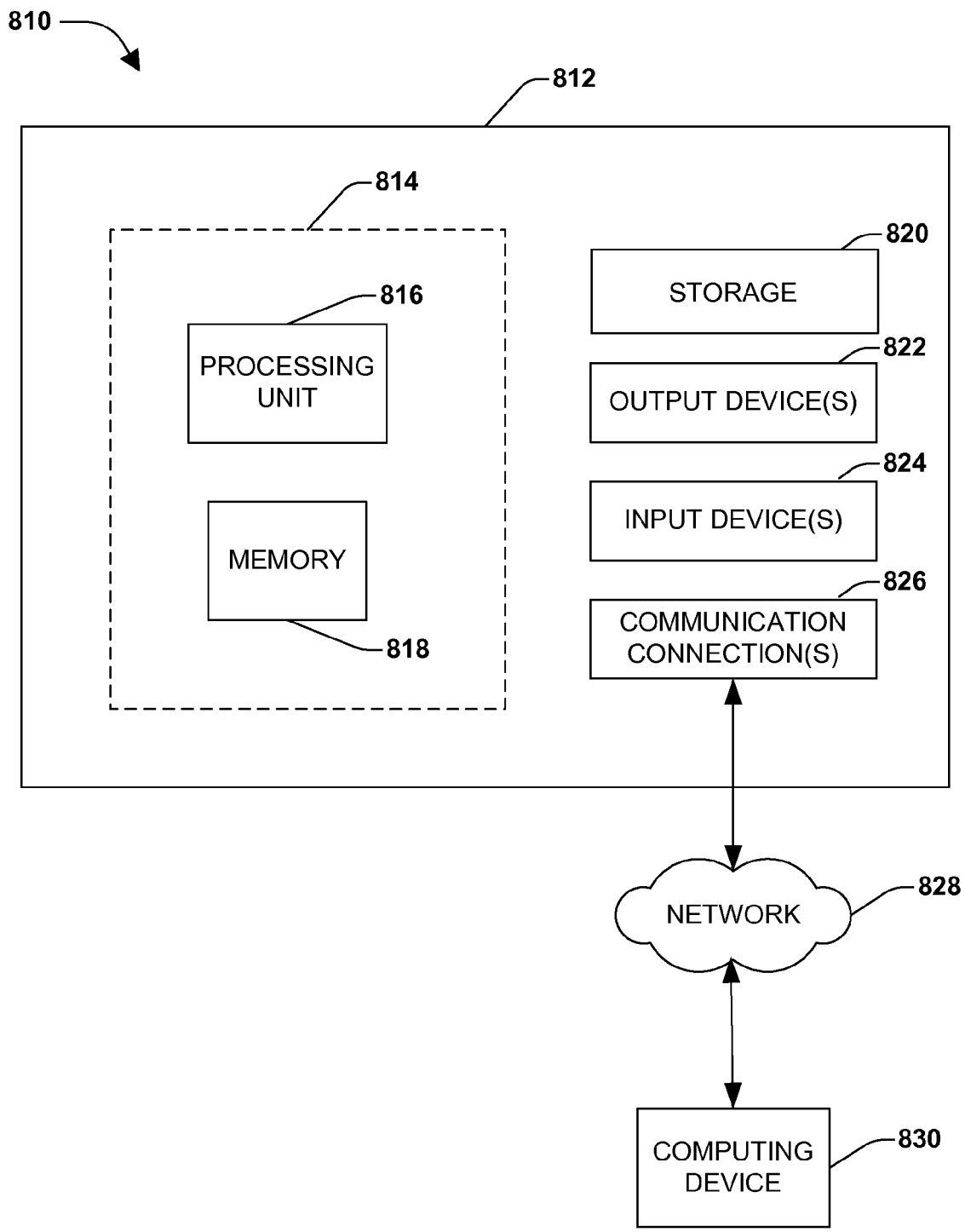
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
   receiving a first character set comprising one or more characters;
   identifying a first unique identifier, comprising more than two numbers, corresponding to a first word having a first prefix that matches the first character set;
   identifying a first predefined probability for the first word based upon the first unique identifier, where the first predefined probability does not change in response to a modification to the first character set, the first unique identifier associated with the first predefined probability in a lookup table stored in a database;
   identifying a second unique identifier, comprising more than two numbers, corresponding to a second word having a second prefix that matches the first character set;
   identifying a second predefined probability for the second word based upon the second unique identifier, where the second predefined probability does not change in response to the modification to the first character set, the second unique identifier associated with the second predefined probability in the lookup table stored in the database; and
   displaying at least one of the first word when the first predefined probability is within a desired probability range or the second word when the second predefined probability is within the desired probability range,
   at least some of the method implemented at least in part via a processing unit.

2. The method of claim 1, the first prefix the same as the second prefix.

3. The method of claim 1, the first predefined probability related to a likelihood that the first word matches a word a user is intending to input.

4. The method of claim 1, the first unique identifier comprising an integer.

5. The method of claim 1, the first predefined probability different than the second predefined probability.

6. The method of claim 1, the second predefined probability related to a likelihood that the second word matches a word a user is intending to input.

7. The method of claim 1, the second unique identifier comprising an integer.

8. The method of claim 1, the first unique identifier different than the second unique identifier.

9. The method of claim 1, the receiving a first character set comprising receiving the first character set in at least one of an email message or a text message.

10. A system, comprising:
    one or more processing units; and
    memory comprising instructions that when executed by at least one of the one or more processing units, perform a method comprising:
      receiving a first character set comprising one or more characters;
      identifying a first unique identifier corresponding to a first word having a first prefix that matches the first character set;
      identifying a first predefined probability for the first word based upon the first unique identifier, the first unique identifier associated with the first predefined probability in a lookup table stored in a database;
      identifying a second unique identifier corresponding to a second word having a second prefix that matches the first character set;
      identifying a second predefined probability for the second word based upon the second unique identifier, the second unique identifier associated with the second predefined probability in the lookup table stored in the database; and
      displaying at least one of the first word when the first predefined probability is within a desired probability range or the second word when the second predefined probability is within the desired probability range.

11. The system of claim 10, the first predefined probability different than the second predefined probability.

12. The system of claim 10, the first unique identifier comprising an integer.

13. The system of claim 10, the first unique identifier different than the second unique identifier.

14. The system of claim 10, the first word associated with the first unique identifier in the database.

15. The system of claim 10, the first predefined probability related to a likelihood that the first word matches a word a user is intending to input.

16. The system of claim 10, the second predefined probability related to a likelihood that the second word matches a word a user is intending to input.

17. The system of claim 10, the first prefix the same as the second prefix.

18. A computer readable medium, excluding signals, comprising processor executable instructions that when executed perform a method comprising:
    receiving a first character set comprising one or more characters;
    identifying a first unique identifier, comprising more than two numbers, corresponding to a first word having a first prefix that matches the first character set;
    identifying a first predefined probability for the first word based upon the first unique identifier, the first unique identifier associated with the first predefined probability in a lookup table stored in a database; and
    displaying the first word when the first predefined probability is within a desired probability range.

19. The computer readable medium of claim 18, the first predefined probability related to a likelihood that the first word matches a word a user is intending to input.

20. The computer readable medium of claim 18, the first unique identifier comprising an integer.

* * * * *